United States Patent

Sekihara et al.

Patent Number: 5,961,041
Date of Patent: Oct. 5, 1999

[54] METHOD AND APPARATUS FOR MAKING CARBON DIOXIDE SNOW

[75] Inventors: Shoji Sekihara; Saburo Hayakawa; Makoto Toriumi; Toshiyasu Suzuki, all of Tokyo, Japan

[73] Assignee: Nippon Sanso Corporation, Tokyo, Japan

[21] Appl. No.: 08/997,882

[22] Filed: Dec. 24, 1997

[30] Foreign Application Priority Data

Dec. 25, 1996 [JP] Japan .................................. 8-345250
Aug. 14, 1997 [JP] Japan .................................. 9-219612

[51] Int. Cl.⁶ ..................................................... F25C 3/04
[52] U.S. Cl. ........................... 239/2.2; 239/14.2; 239/499
[58] Field of Search ................................ 239/1, 2.2, 14.2, 239/14.1, 418, 433, 434, 499; 62/74, 10, 344, 388, 63, 76

[56] References Cited

U.S. PATENT DOCUMENTS 3,667,242  6/1972  Kilburn .................................. 62/10
4,111,362  9/1978  Carter, Jr. .............................. 239/1

Primary Examiner—Andres Kashnikow
Assistant Examiner—Dinh Q. Nguyen
Attorney, Agent, or Firm—Armstrong, Westerman, Hattori, McLeland & Naughton

[57] ABSTRACT

Disclosed are a method of making $CO_2$ snow by injecting liquefied $CO_2$ into a snow horn from the ceiling of the snow horn having an opening at the lower end to effect adiabatic expansion and an apparatus therefor. Liquefied $CO_2$ is injected radially outward so that it may flow along the curved internal surface of the ceiling and continuously along the internal surface of the snow horn and that effusive flows of liquefied $CO_2$ may flow independently at the inner upper part of the snow horn and may be combined partly with one another at the inner lower part of the snow horn.

10 Claims, 11 Drawing Sheets

METHOD AND APPARATUS FOR MAKING CARBON DIOXIDE SNOW

BACKGROUND OF THE INVENTION AND RELATED ART STATEMENT

The present invention relates to a method for making carbon dioxide snow and to an apparatus therefor. More particularly, the present invention relates to a method for making snow-like dry ice by subjecting liquefied carbon dioxide to adiabatic expansion and to an apparatus therefore.

Carbon dioxide ($CO_2$) snow is employed widely as such or in the form of dry ice blocks formed by hardening such snow for refrigerating drinks and food or for keeping them fresh. $CO_2$ snow is made by injecting liquefied $CO_2$ through a nozzle into a cylinder, called a snow horn, having an opening at the lower end to effect adiabatic expansion.

Apparatuses having various structures have been proposed so as to make $CO_2$ snow efficiently. For example, Japanese Utility Model Publication Nos. Sho 56-3309 and Sho 56-3310 describe apparatuses employing nearly cyclone-shaped snow horns to which liquefied $CO_2$ is injected in tangential directions of the snow horns, respectively. Japanese Unexamined Patent Publication No. Hei 6-257937 describes an apparatus in which liquefied $CO_2$ is injected from a nozzle protruding into a snow horn to form spiral flows. Japanese Unexamined Patent Publication No. Hei 6-298513 describes a structure in which liquefied $CO_2$ is injected from a nozzle disposed to oppose an injecting section protruding into a snow horn. U.S. Pat. No. 4,911,362 describes an apparatus having a pair of snow horns which are arranged to form a Y shape.

However, these $CO_2$ snow making apparatuses are designed to obtain dry ice having properties suitable for freezing food and the like and are directed to achieve improvement in the yield of dry ice, reduction of noises, etc. Accordingly, the dry ice obtained assumes a form of small snowflakes, so-called powder snow.

Meanwhile, when snow is allowed to flow artificially as a scenic effect in various events and attractions, the artificial snow is desired to stay in the air as long as possible and is of snowflakes which can flutter so as to be impressive to viewers. However, the artificial snow made according to the prior art is mainly directed to be deposited on slopes of skiing areas and the like, so that the conventional techniques of making artificial snow cannot give fluttering artificial snowflakes which appeal to viewers. Further, the $CO_2$ snow made by any of the prior art $CO_2$ snow making apparatuses is of small snowflakes. Accordingly, if such artificial snow is employed in an event and the like, it has poor visual effect and stays in the air too short to give sufficient scenic effect. For such reason, when a snowy scene is to be produced in an event and the like, for example, soap bubbles, styrofoam and confetti have been employed as substitutes for snow.

OBJECT AND SUMMARY OF THE INVENTION

Therefore, it is an objective of the present invention to provide a method for making $CO_2$ snow capable of giving efficiently artificial snow which can of course be employed for refrigerating drinks and food or for keeping them fresh and which is also suitable to be enjoyed by viewers, i.e. which stays long in the air and is of thin snowflakes which can flutter and also to provide an apparatus therefor.

According to the method for making $CO_2$ snow of the present invention, to a snow horn having an opening at the lower end is injected liquefied $CO_2$ at the ceiling thereof to effect adiabatic expansion of the liquefied $CO_2$ to form $CO_2$ snow. The liquefied $CO_2$ is injected radially so that it may flow along the concavely curved internal surface of the ceiling and continuously along the internal surface of the barrel of the snow horn and that effusive flows of liquefied $CO_2$ may flow independently at the inner upper part of the snow horn and may be combined partly with one another at the inner lower part of the snow horn.

According to the method of making $CO_2$ snow, a gas (air, vaporized $CO_2$ formed after vapor-liquid separation) is blown against the $CO_2$ snow falling through the opening of the snow horn, and wind velocity of the gas is controlled so as to adjust the size of the snowflakes of the $CO_2$ snow.

Further, according to the method of making $CO_2$ snow, liquefied $CO_2$ is introduced from a liquefied $CO_2$ tank into a tilting tube to effect vapor-liquid separation, and vaporized $CO_2$ is extracted at the upper part of the tilting tube, while the liquefied $CO_2$ drawn from the lower part of the tilting tube is injected into the snow horn.

The apparatus for making $CO_2$ snow according to one aspect of the present invention contains a snow horn having an opening at the lower end and a nozzle provided at the ceiling of the snow horn to inject liquefied $CO_2$ into the snow horn. The injection nozzle is positioned to be able to inject the liquefied $CO_2$ radially so that it may flow along the curved internal surface of the ceiling and continuously along the internal surface of the barrel and that effusive flows of liquefied $CO_2$ may flow independently at the inner upper part of the snow horn and may be combined partly with one another at the inner lower part of the snow horn.

The apparatus for making $CO_2$ snow also has, in the vicinity of the opening of the snow horn, a blowing unit whose wind velocity is designed to be adjustable. The blowing unit contains a blower which utilizes as a drive source the vaporized $CO_2$ separated by a vapor-liquid separator disposed on a line of supplying the liquefied $CO_2$ to the injection nozzle.

The apparatus for making $CO_2$ snow according to another aspect of the invention contains a plurality of injection nozzles positioned on the internal surface of the ceiling, and the direction of injecting liquefied $CO_2$ from each nozzle is set to be 0 to 90° with respect to the radius of the ceiling.

The apparatus for making $CO_2$ snow also has a tilting pipe connected to a draw pipe for drawing a liquefied $CO_2$ from a liquefied $CO_2$ tank, and the tilting pipe has at the upper part an outlet for the vaporized $CO_2$ separated in the tilting pipe and at the lower part a liquefied $CO_2$ feed pipe for supplying the liquefied $CO_2$ separated in the tilting pipe to the injection nozzle. The draw pipe is connected to the middle part of the tilting pipe. The tilting pipe is wound spirally around the snow horn.

The $CO_2$ snow made according to the present invention can be employed suitably not only for refrigerating drinks and food or keeping them fresh but also for producing snowy scenes in various events and attractions, since the $CO_2$ snow is of snowflakes which can stay long in the air.

Further, since the tilting pipe having a predetermined tilt angle efficiently carries out vapor-liquid separation to prevent vaporized $CO_2$ from migrating into the liquefied $CO_2$ to be injected into the snow horn, $CO_2$ snow can be made in a stable state.

Furthermore, since the tilting pipe is spirally wound around the snow horn, the entire system can be downsized compared with the case where a tank-like vapor-liquid separator is employed.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments taken in conjunction with the attached drawings in which:

FIGS. 1 to 4 are drawings showing a first embodiment of the present invention; in which:

FIG. 1 is a system diagram;

FIG. 2 shows an injection nozzle for injecting liquefied $CO_2$ viewed through the lower end opening of the snow horn;

FIG. 3 is a vertical cross-sectional view showing the injection nozzle; and

FIG. 4 is an explanatory drawing showing a state of effusive flows of liquefied $CO_2$.

FIGS. 5 to 7 are drawings showing a second embodiment of the present invention; in which:

FIG. 5 is a system diagram;

FIG. 6 shows injection nozzles viewed through the lower end opening of the snow horn; and FIG. 7 is a vertical cross-sectional view showing the injection nozzles;

FIGS. 8 and 9 are drawings showing a third embodiment of the present invention; in which FIG. 8 shows injection nozzles viewed through the lower end opening of the snow horn; and FIG. 9 is a vertical cross-sectional view showing the injection nozzles;

FIGS. 12 to 14 are views showing a sixth embodiment of the present invention; in which:

FIG. 12 is a system diagram;

FIG. 13 is an explanatory drawing showing a state of vapor-liquid separation occurring in the tilting pipe; and FIG. 14 is a partially cutaway plan view of an example of state showing how the tilting pipe and a liquefied $CO_2$ draw pipe are connected.

DETAILED DESCRIPTION OF THE PREFERRED EMBODIMENTS

Figure 1:
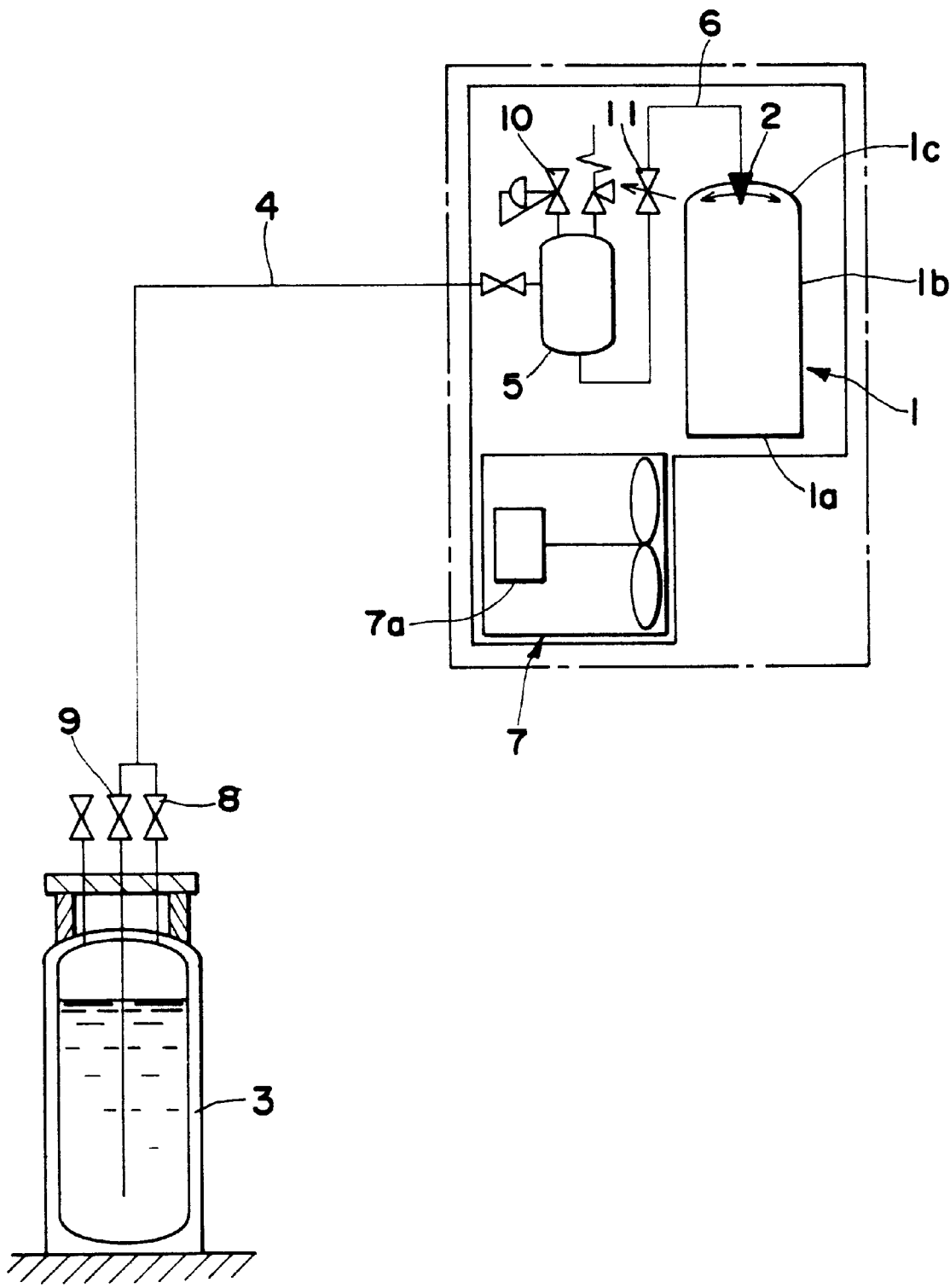

The present invention will be described below in more detail referring to the drawings.

Figure 2:
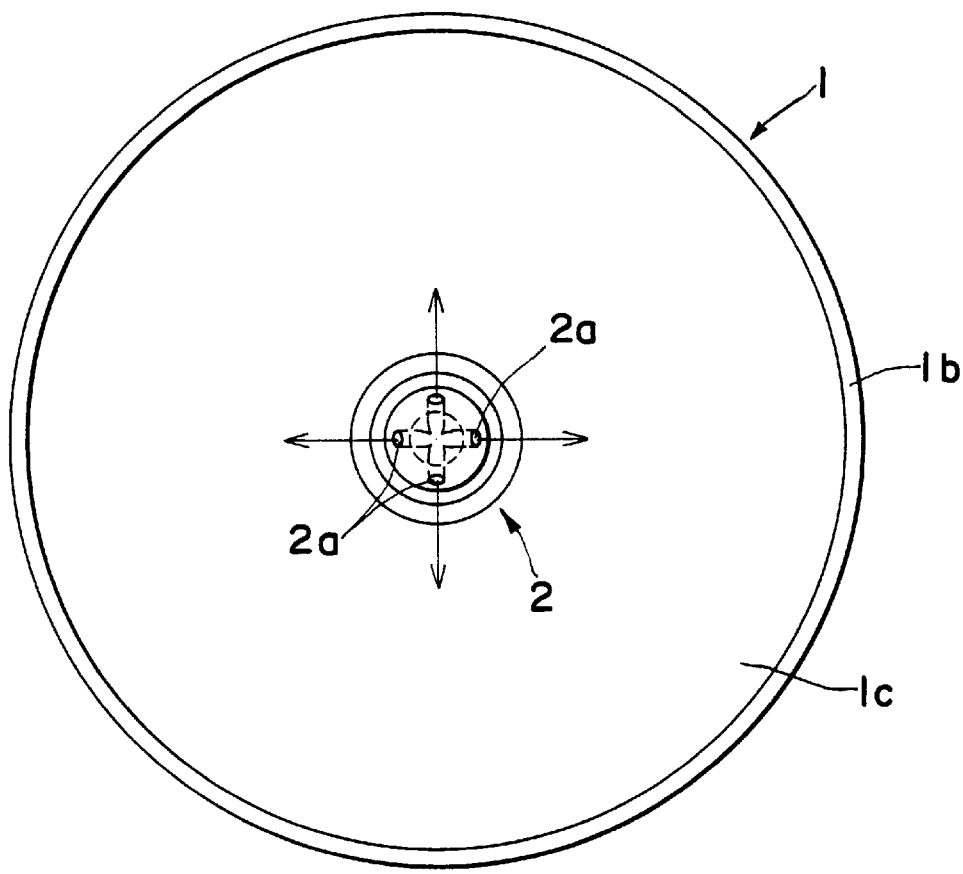
Figure 3:
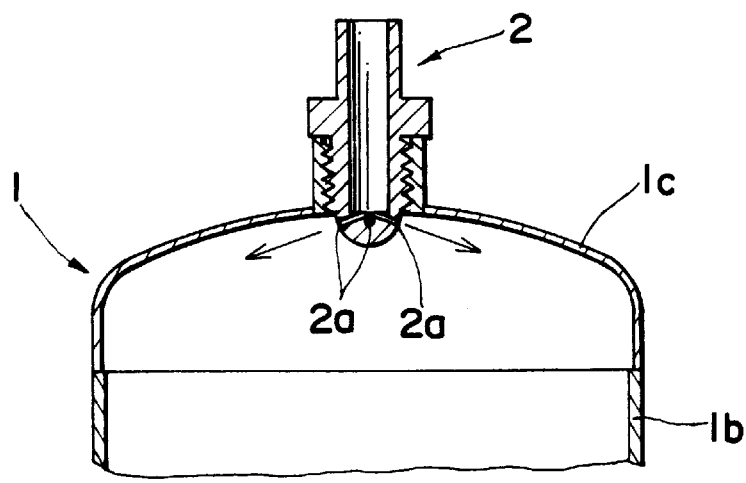
Figure 4:
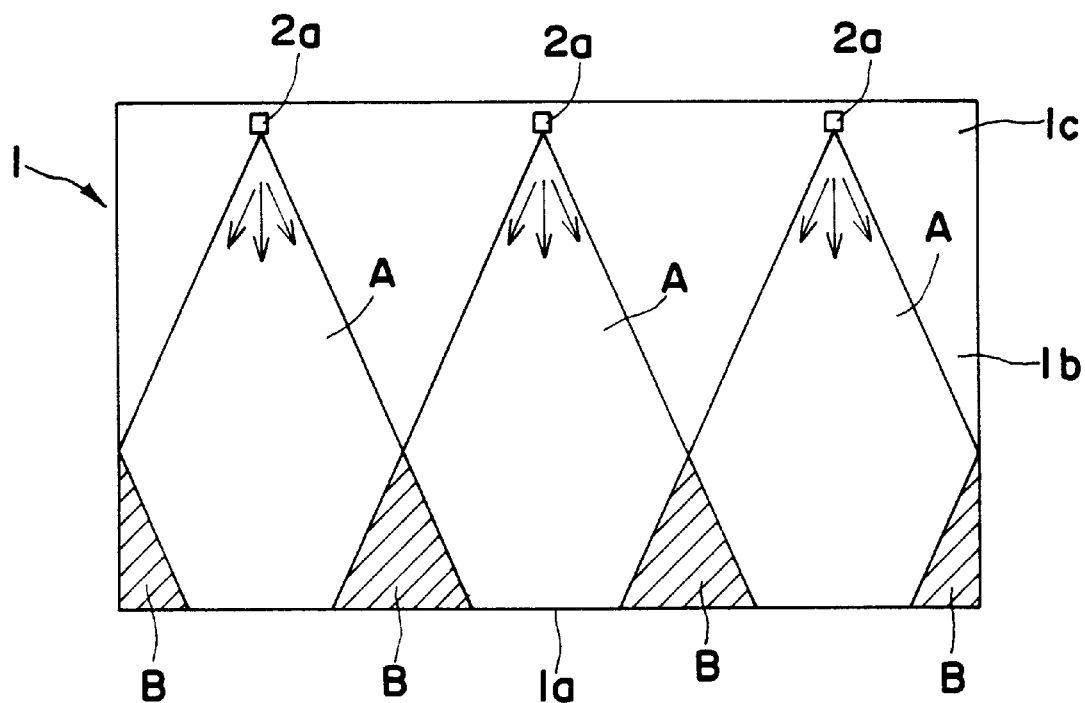

FIGS. 1 to 4 show a first embodiment of the present invention. FIG. 1 is a system diagram showing the overall constitution of the apparatus for making $CO_2$ snow; FIG. 2 shows an injection nozzle for injecting liquefied $CO_2$ viewed through the lower end opening of the snow horn; FIG. 3 is a vertical cross-sectional view showing the injection nozzle; and FIG. 4 is an explanatory drawing showing a state of effusive flows of liquefied $CO_2$.

The apparatus for making $CO_2$ snow according to the first embodiment contains a snow horn 1 for forming $CO_2$ snow, an injection nozzle 2 for injecting liquefied $CO_2$ into the snow horn 1, a liquefied $CO_2$ tank 3 as a source of liquefied $CO_2$, a draw pipe 4 for the drawing liquefied $CO_2$ from the liquefied $CO_2$ tank 3, a vapor-liquid separator 5 connected to the draw pipe 4, a liquefied $CO_2$ feed pipe 6 for supplying liquefied $CO_2$ from which vaporized $CO_2$ has been separated by the vapor-liquid separator 5 to the injection nozzle 2 and a blower 7 disposed diagonally below the snow horn 1.

The snow horn 1 consists of a cylindrical barrel 1b having an opening 1a at the lower end, and a ceiling 1c having a curved internal surface. The injection nozzle 2 is positioned at the center of the ceiling 1c. The ceiling 1c is preferably allowed to have a concavely smoothly curved shape such that liquefied $CO_2$ injected from the injection nozzle 2 may flow smoothly from the ceiling 1c toward the internal surface of the barrel 1b and that dry ice thus formed may not be deposited junction of the ceiling 1c and the barrel 1b, e.g., a dome having, for example, a hemispherical shape.

The injection nozzle 2 has four nozzle holes 2a formed at angular intervals of 90°. These nozzle holes 2a are oriented such that liquefied $CO_2$ injected through them may flow along the internal surface of the ceiling 1c and continuously along the internal surface of the barrel 1b. The snow horn 1 and the nozzle holes 2a are designed to have dimensions and shapes respectively such that effusive flows A of liquefied $CO_2$ injected through the nozzle holes 2a may flow independently at the upper part of the barrel 1b and may be combined partly with one another in the vicinity of the opening 1a at the lower end of the barrel 1b to form combined flows B, as shown in the developed view of the internal surface of the snow horn 1 in FIG. 4.

When $CO_2$ snow is to be made in the thus constituted apparatus, in order to prevent formation of dry ice in the piping and blocking of the piping with the dry ice when supply of liquefied $CO_2$ is started, a vaporized $CO_2$ outlet valve 8 of the liquefied $CO_2$ tank 3 is first opened before operation of making $CO_2$ snow is started to supply vaporized $CO_2$ to the draw pipe 4, vapor-liquid separator 5 and the liquefied $CO_2$ supply pipe 6, where it is pressurized and cooled. Subsequently, a liquefied $CO_2$ outlet valve 9 is opened, and the vaporized $CO_2$ outlet valve 8 is closed to start supply of the liquefied $CO_2$ in the liquefied $CO_2$ tank 3.

The liquefied $CO_2$ drawn out of the liquefied $CO_2$ tank 3 into the draw pipe 4 is separated from vaporized $CO_2$ in the vapor-liquid separator 5. The separated vaporized $CO_2$ is exhausted with the internal pressure of the vapor-liquid separator 5 being maintained by a back pressure regulating valve 10. The liquefied $CO_2$ separated in the vapor-liquid separator 5 is supplied to the injection nozzle 2 under control of flow rate by a valve 11. The liquefied $CO_2$ injected from the injection nozzle 2 into the snow horn 1 undergoes adiabatic expansion to be partly converted into $CO_2$ snow, and effusive flows of liquefied $CO_2$ containing $CO_2$ snow thus formed grow into snowflakes as they flow independently and regularly along the internal surface of the snow horn 1. Each of the resulting $CO_2$ snow flows are combined with the adjacent flows, and the snowflakes impinge upon one another to form larger snowflakes around the opening 1a, which fall through the opening 1a and are blown up to flutter on the air fed from the blower 7 driven by a motor 7a.

Since liquefied $CO_2$ is allowed to flow along the internal surface of the snow horn 1 as described above, the $CO_2$ snow thus formed can be grown into larger snowflakes which show high air resistance when they fall, giving $CO_2$ snow which can stay long in the air.

Further, since the blower 7 is located near the snow horn 1 to blow air against the $CO_2$ snowflakes falling through the opening 1a, white fuming occurring due to the moisture in the atmosphere around the opening 1a and the coldness of dry ice can be blown away. Thus, not only poor visibility or deterioration of appearance of $CO_2$ snow to be caused by white fuming can be avoided, but also the thus formed $CO_2$ snow can be dispersed over a wide area.

Furthermore, the size of $CO_2$ snowflakes can be adjusted, for example, within the range of about 8 to 60 mm, by controlling the volume and velocity of air to be blown from the blower 7, and the $CO_2$ snow scattering area can be also adjusted simultaneously.

In addition, since the liquefied $CO_2$ supplied to the injection nozzle 2 is separated from vaporized $CO_2$ in the vapor-liquid separator 5, $CO_2$ snow can be made in a stable state with reduced pulsation.

Figure 5:
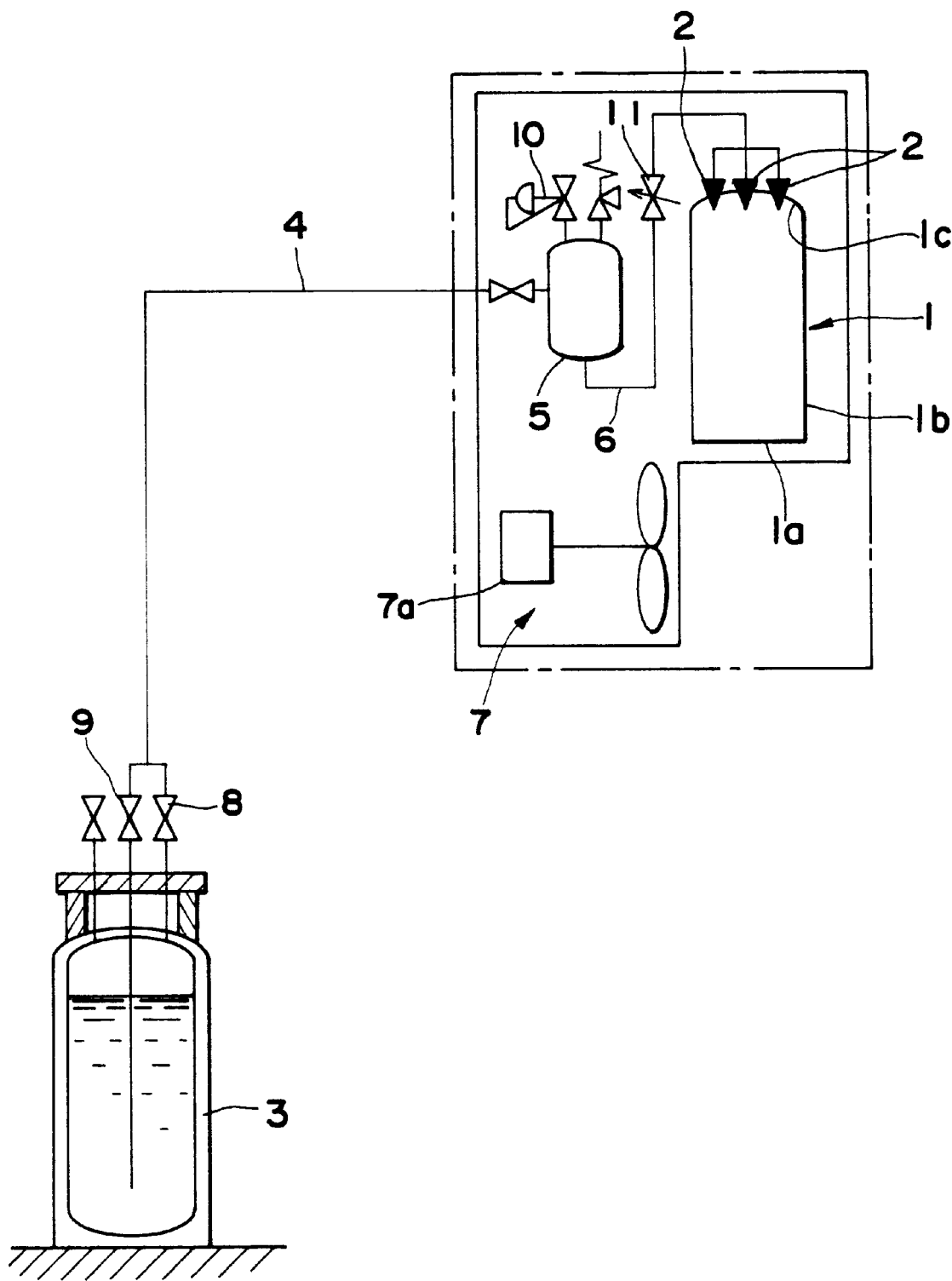
Figure 6:
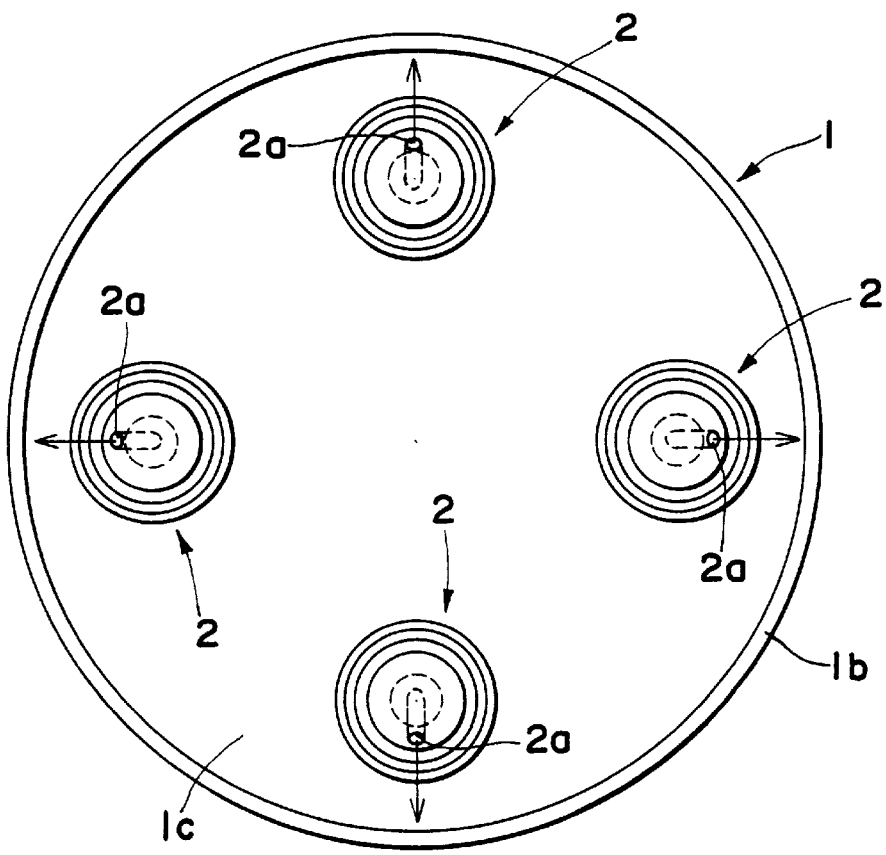
Figure 7:
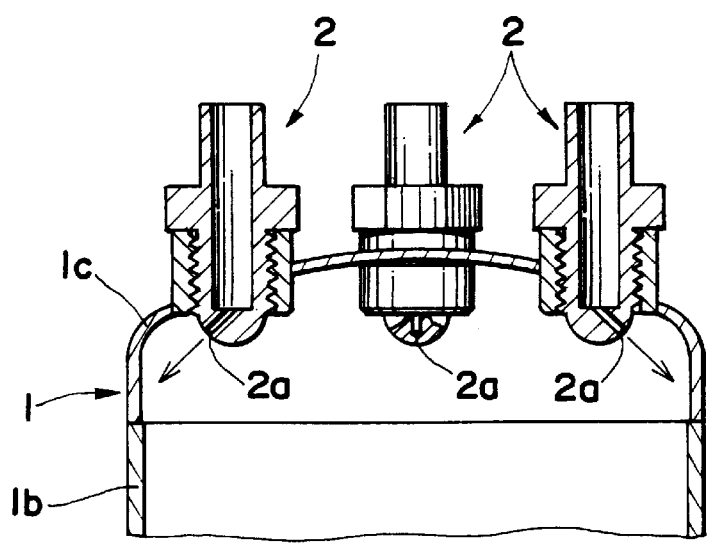

FIGS. 5 to 7 show a second embodiment of the present invention. FIG. 5 is a system diagram showing the overall constitution of the apparatus; FIG. 6 show injection nozzles viewed through the lower opening of the snow horn; and FIG. 7 is a vertical cross-sectional view showing the injection nozzles. It should be noted that in the following description, the same reference numerals as in the first embodiment are used to designate the same or corresponding elements, and detailed description of them will be omitted.

The apparatus for making $CO_2$ snow according to the second embodiment has four injection nozzles 2 positioned at the ceiling 1c of the snow horn 1 having the same structure as in the first embodiment. These four injection nozzles 2 are positioned at equiangular intervals (90° intervals) on the same circle. Each injection nozzle 2 has one nozzle hole 2a, and the nozzle hole 2a is designed to inject liquefied $CO_2$ outward in the radial direction of the ceiling 1c.

Thus, a plurality of injection nozzles 2 can be provided at the ceiling 1c of the snow horn 1 depending on the number of nozzle holes 2a, the size of the snow horn 1, etc. These plurality of injection nozzles 2 provided at the ceiling 1c can give $CO_2$ snowflakes suitably employed as artificial snow by forming effusive flows of liquefied $CO_2$ along the internal surface of the snow horn 1 as described above.

Figure 8:
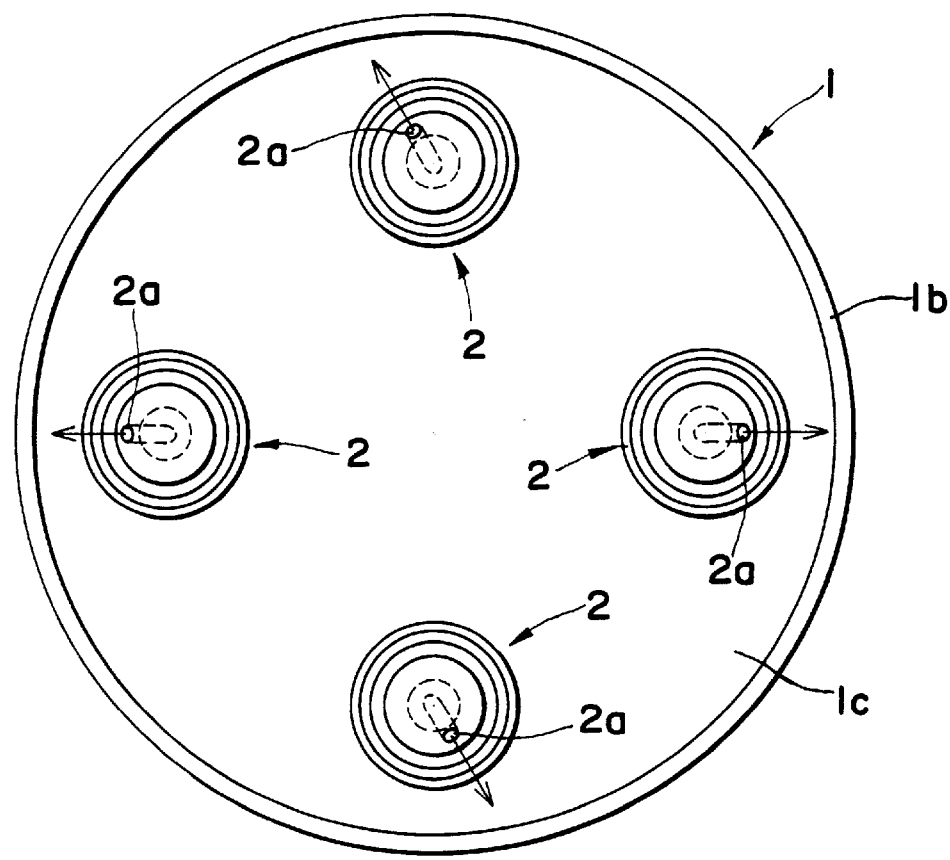
Figure 9:
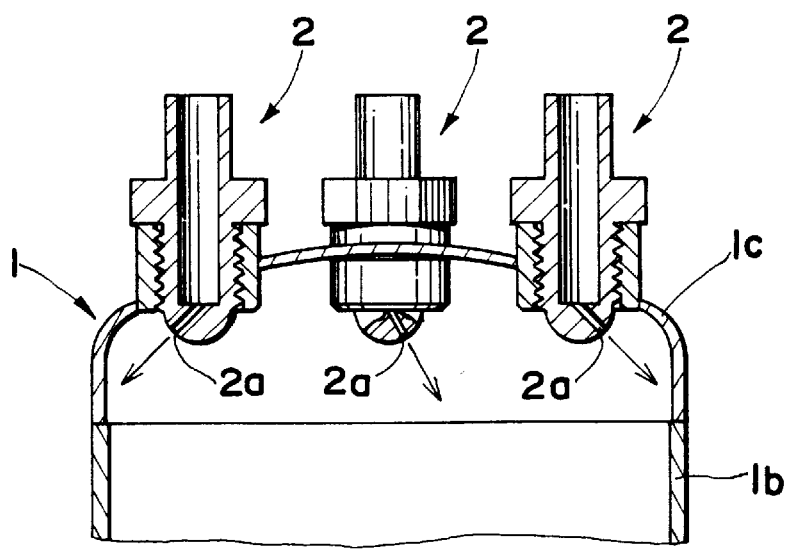

FIGS. 8 and 9 show a third embodiment of the present invention. FIG. 8 shows injection nozzles viewed through the lower opening of the snow horn; and FIG. 9 is a vertical cross-sectional view showing the injection nozzles.

In the third embodiment, four injection nozzles 2 are located at the ceiling 1c of the snow horn 1 like in the second embodiment. However, the injection holes 2a in one opposing pair (left and right injection holes 2a in FIG. 8) of injection nozzles 2 are designed to inject liquefied $CO_2$ in the radial direction of the ceiling 1c like in the second embodiment and the injection holes 2a of the other opposing pair of injection nozzles 2 (upper and lower injection holes 2a in FIG. 8) are designed to inject liquefied $CO_2$ at a predetermined angle with respect to the radius of the ceiling 1c.

As described above, by tilting the direction of injecting liquefied $CO_2$ with respect to the radial direction of the ceiling 1c in some nozzle holes 2a, the state of combined flows B formed by the effusive flows A of liquefied $CO_2$ shown in FIG. 4 around the opening 1a can be changed, whereas by adjusting the direction of injecting liquefied $CO_2$ through the nozzle holes 2a depending on the configuration of the snow horn 1, liquefied $CO_2$ injecting rate, etc., $CO_2$ snowflakes having desired sizes can be made.

While the liquefied $CO_2$ injecting direction or angle with respect to the radial direction of the ceiling 1c may depend on the configuration of the snow horn 1, particularly on the length and diameter of the barrel 1b or on the diffusing angle of the liquefied $CO_2$ to be injected through the nozzle holes 2a, usually, it is preferably 90° or less, more preferably 45° or less with respect to the radial direction of the ceiling 1c. More specifically, if a large injecting angle is secured with respect to the radial direction of the ceiling 1c, the length of the flow of liquefied $CO_2$ from the nozzle hole 2a to the opening 1a can be increased, and growth of $CO_2$ snow in the combined flows B can be accelerated, enabling downsizing of the snow horn 1. However, if the injecting angle is excessively great, the liquefied $CO_2$ ($CO_2$ snow) forms vigorous spiral flows in the snow horn 1 to compress $CO_2$ snowflakes and hinder growth of $CO_2$ snow.

Accordingly, it is preferred that a plurality of nozzle holes 2a are set to have injecting angles within the range of 0 to 45°. It is also possible to orient all the nozzle holes 2a in the same direction with respect to the radial direction of the ceiling 1c and at the same angle or to orient each adjacent pair of nozzle holes 2a to oppose each other.

Figure 10:
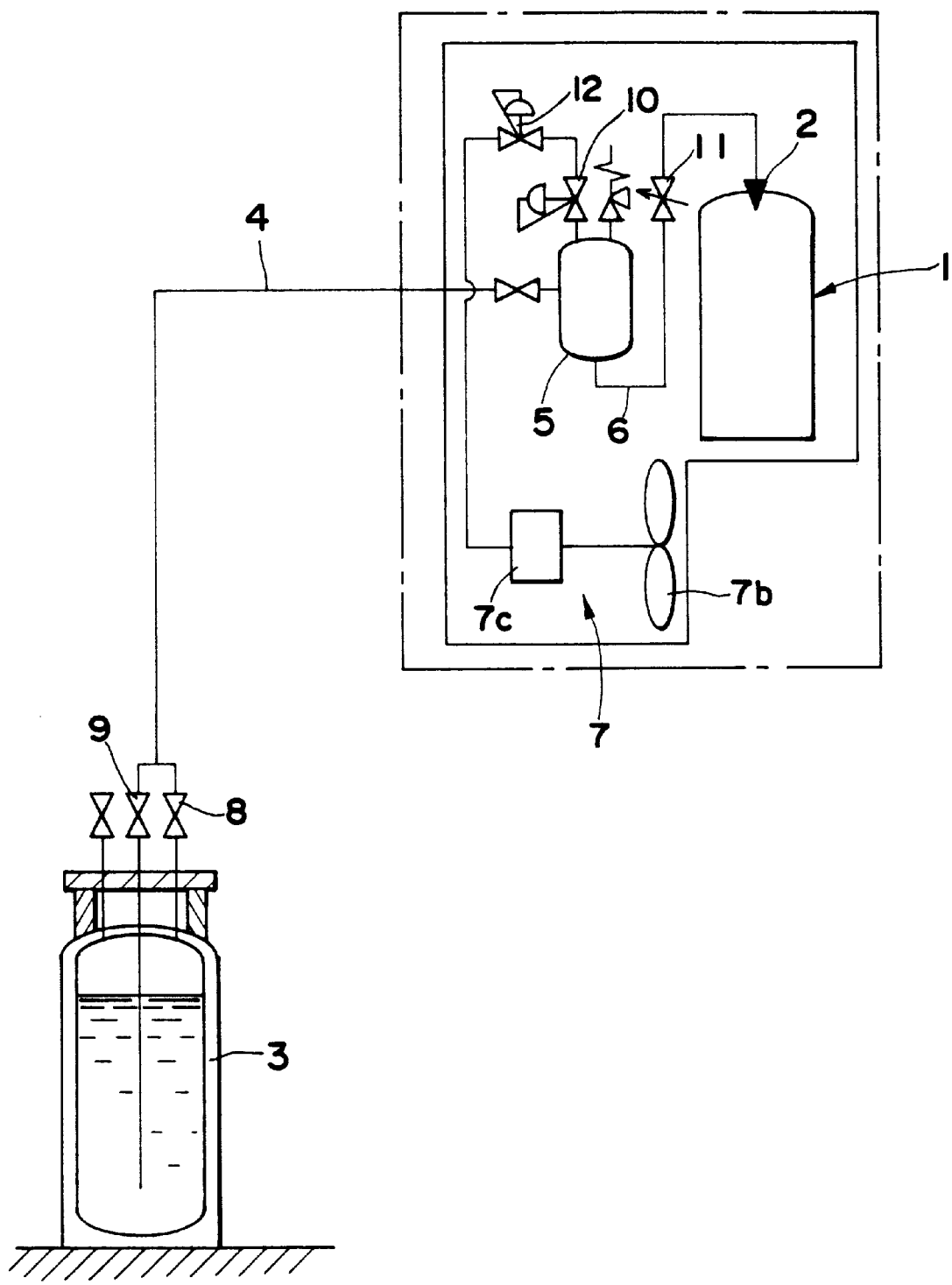
FIG. 10 is a system diagram showing a fourth embodiment of the present invention.

FIG. 10 is a system diagram showing a fourth embodiment of the present invention. In the fourth embodiment, vaporized $CO_2$ separated in the vapor-liquid separator 5 is employed as a drive source for the blower 7. More specifically, the pressure of the vaporized $CO_2$ to be released from the vapor-liquid separator 5 through the back pressure regulating valve 10 is reduced to a suitable level by a pressure reducing valve 12 and then supplied to an air motor 7c, and a fan 7b is adapted to be driven by this vaporized $CO_2$ with the aid of the air motor 7c.

Figure 11:
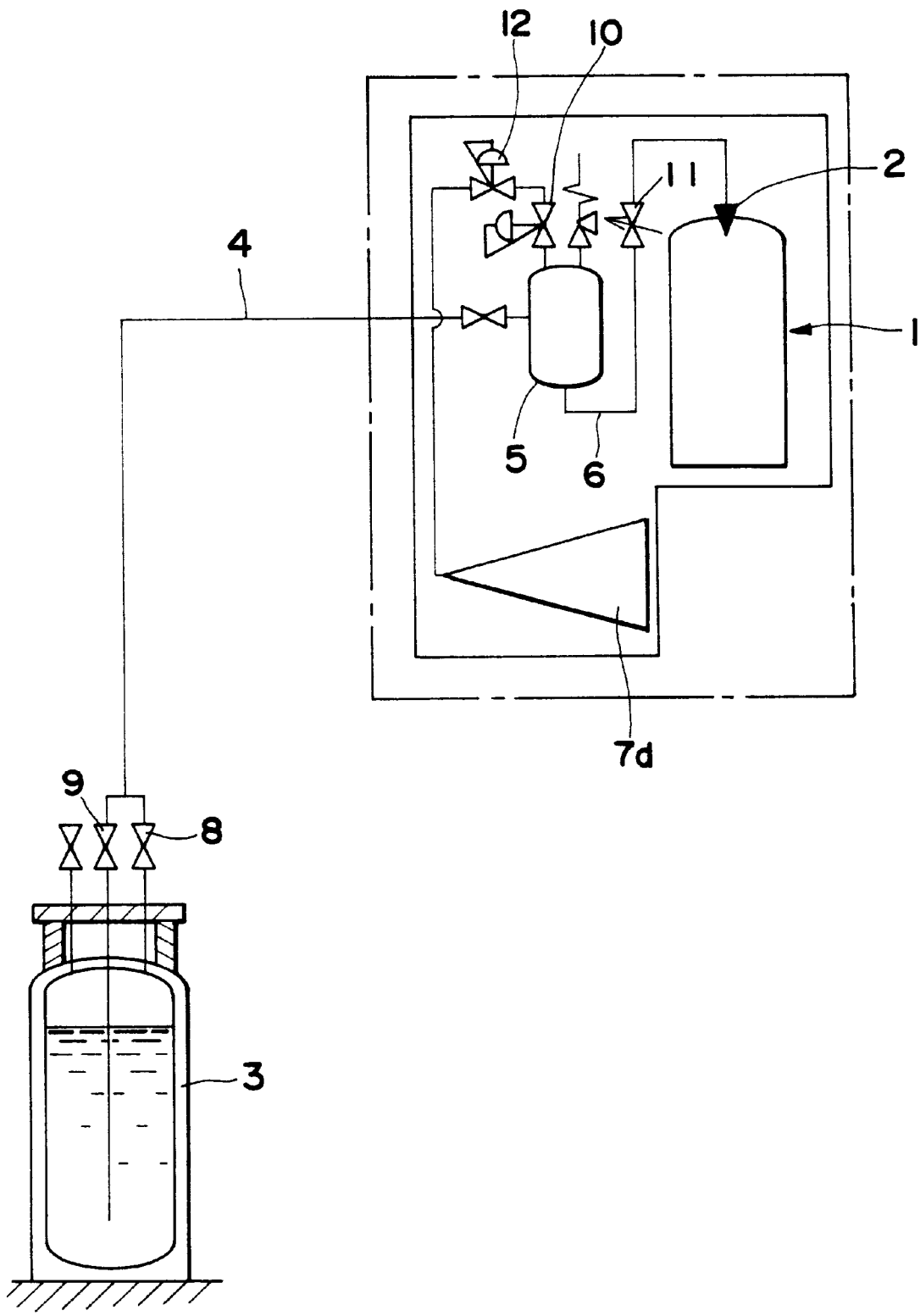
FIG. 11 is a system diagram showing a fifth embodiment of the present invention.

FIG. 11 is a system diagram showing a fifth embodiment of the present invention. In the firth embodiment, the vaporized $CO_2$ separated in the vapor-liquid separator 5 is reduced to a suitable level by the pressure reducing valve 12 and then blown out directly through a diffuser 7d against the $CO_2$ snow falling through the opening 1a of the snow horn 1.

As shown in the fourth and fifth embodiments, $CO_2$ snow can be blown by utilizing the vaporized $CO_2$ separated in the vapor-liquid separator without consuming electricity, leading to simplification of the constitution of the apparatus and reduction of running cost.

Incidentally, the snow horn 1, vapor-liquid separator 5, blower 7, etc. may be housed in a casing or may be disposed at predetermined positions via suitable supporting parts respectively. While the snow horn 1 is preferably oriented such that its axis may be vertical, it may be tilted appropriately. Further, the configuration of the barrel 1b of the snow horn 1 is not limited to the straight cylindrical form as shown in FIG. 1 but may be of a configuration which is reduced at the opening 1a. By suitably reducing the diameter of the opening 1a, intrusion of outside air or intrusion of heat can be controlled to effectively prevent sublimation of the dry ice formed.

The diameter and the like of the nozzle holes 2a of the injection nozzles 2 may be decided depending on the amount of $CO_2$ snow to be made etc. Further, in the case where the snow horn 1 is provided with a plurality of injection nozzles 2, they are preferably located at equal intervals on the same circle at the ceiling 1c as described above. However, the injection nozzles 2 may be positioned at random, or injection nozzles having different injection capacities may be employed in combination.

Figure 12:
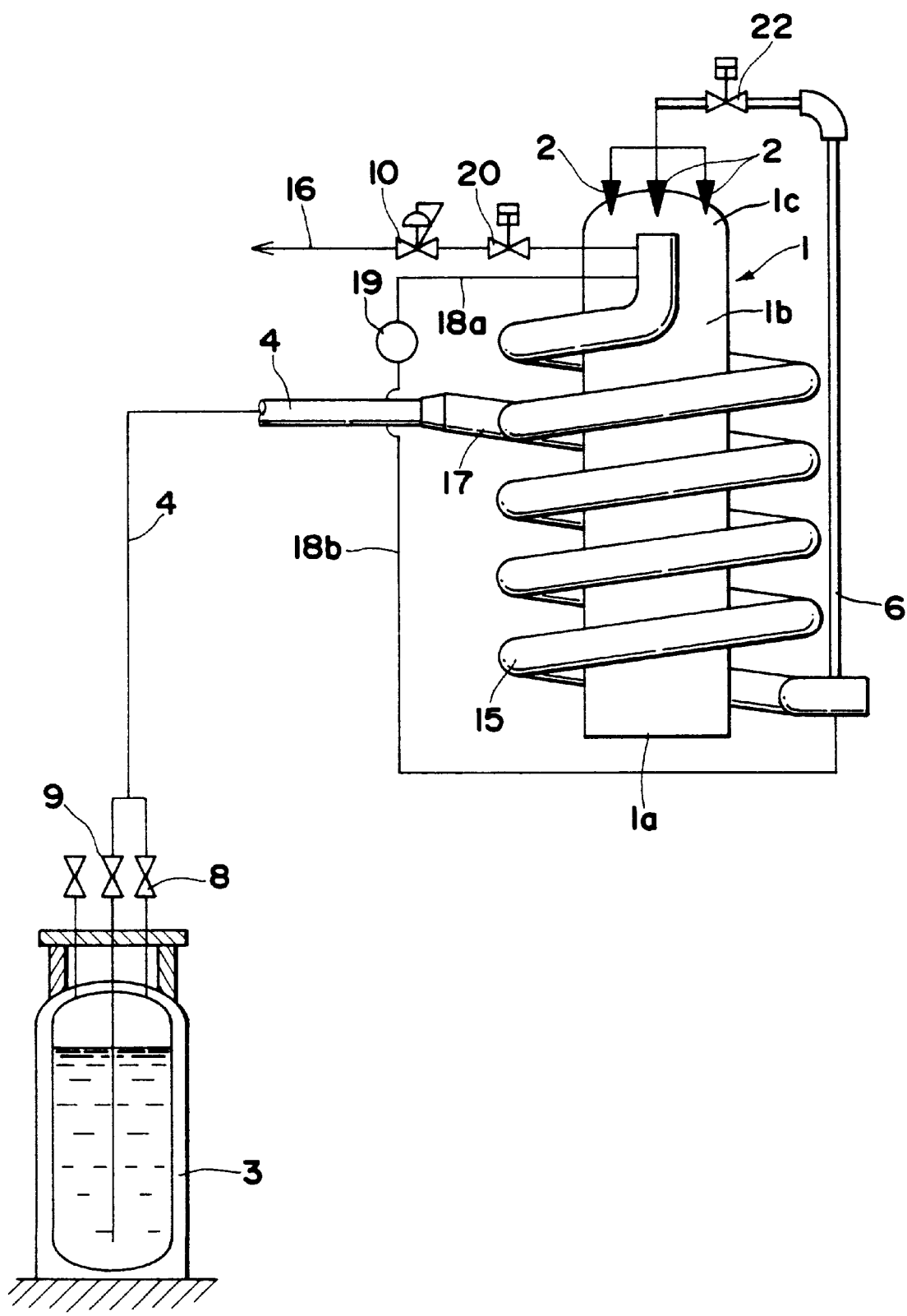
Figure 13:
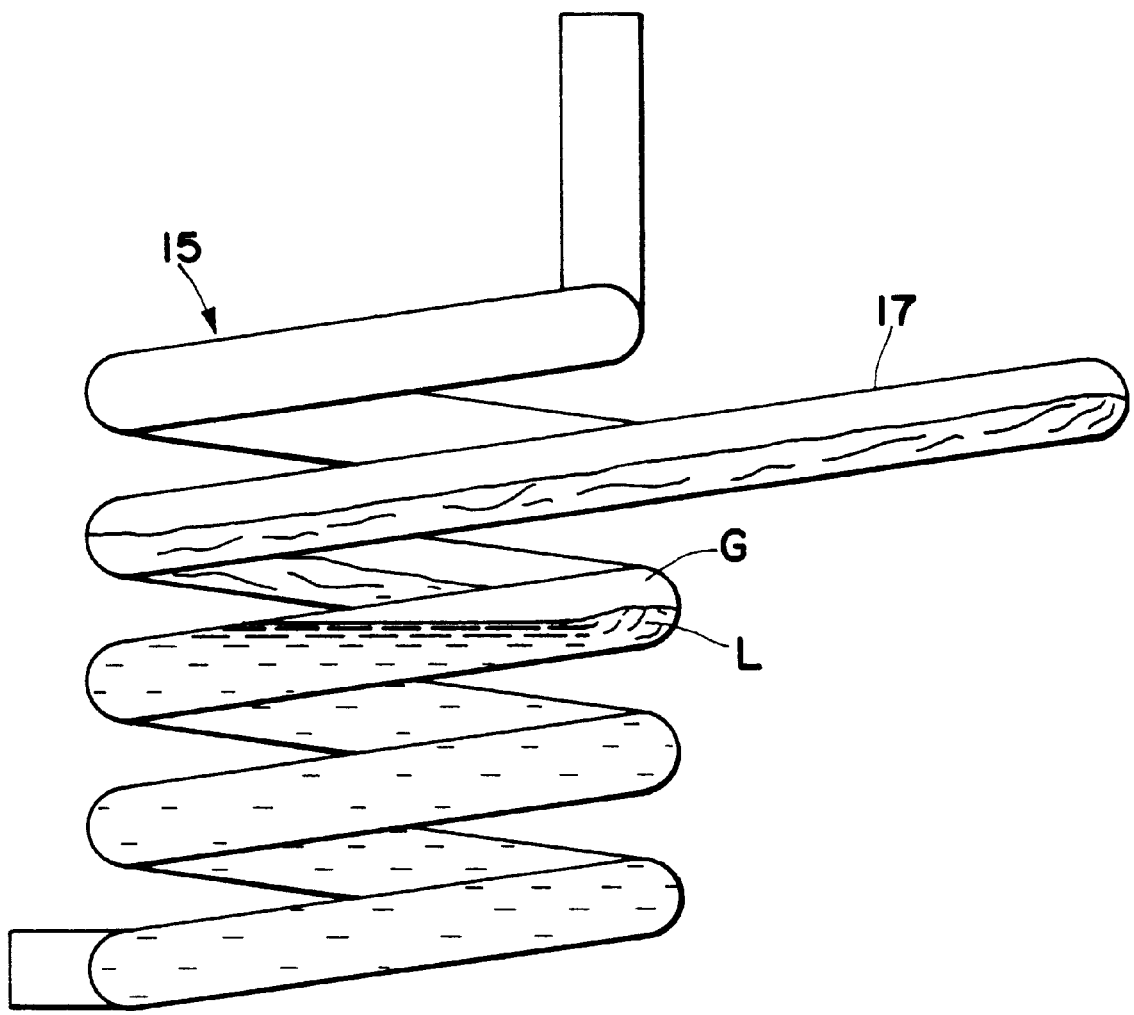
Figure 14:
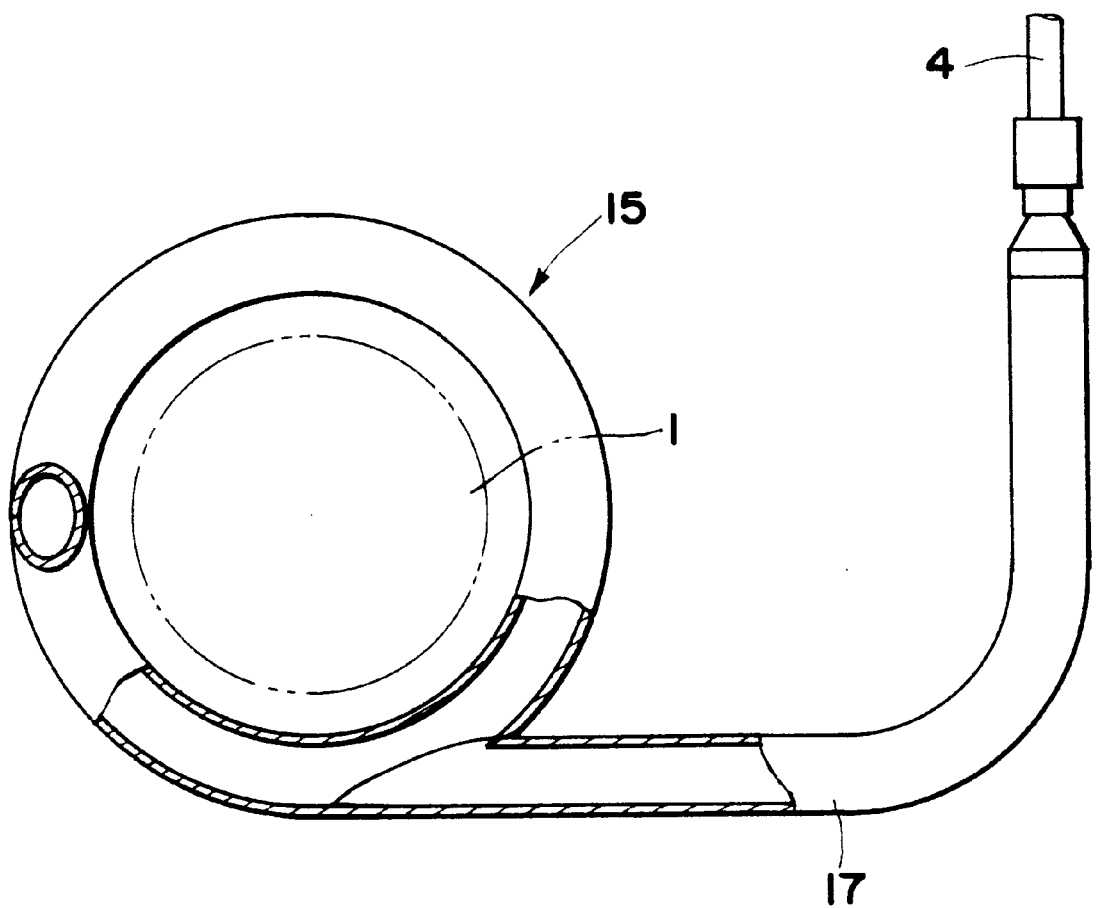

FIGS. 12 to 14 are views showing a sixth embodiment of the present invention; in which FIG. 12 is a system diagram; FIG. 13 is an explanatory drawing showing a state of vapor-liquid separation in the tilting pipe; and FIG. 14 is a partially cutaway plan view of an example of state showing how the tilting pipe and a liquefied $CO_2$ draw pipe are connected.

In the sixth embodiment, a tilting pipe 15 is interposed as a vapor-liquid separator between the liquefied $CO_2$ draw pipe 4 and the liquefied $CO_2$ supply pipe 6. More specifically, this tilting pipe 15 is wound spirally around the snow horn 1 at a predetermined tilt angle, and a vaporized $CO_2$ exhaust pipe 16 for extracting vaporized $CO_2$ separated in the tilting pipe 15 is connected to the upper part of the tilting pipe 15, while a liquefied $CO_2$ supply pipe 6 for supplying the liquefied $CO_2$ subjected to vapor-liquid separation to the injection nozzles 2 is connected to the lower part of the tilting pipe 15, with the draw pipe 4 being connected to the middle part of the tilting pipe 15.

The tilting pipe 15 can easily carry out separation of vaporized $CO_2$ formed by partial evaporation of the liquefied $CO_2$ supplied from the liquefied $CO_2$ tank 3 through the draw pipe 4 due to intrusion of heat into the draw pipe 4. The diameter of the tilting pipe 15 is greater than that of the draw pipe 4. The diameter and the tilt angle of the tilting pipe 15 are set depending, for example, on the feed amount of the $CO_2$ assuming a form of vapor-liquid mixture introduced thereto such that the mixture introduced into the tilting pipe 15 may form a laminar flow, as shown in FIG. 13, and that the separated liquefied $CO_2$ L may flow downward along the lower part of the piping, while the vaporized $CO_2$ G may flow upward along the upper part of the piping.

For example, when the flow rate of the vapor-liquid $CO_2$ mixture is great, the tilting pipe 15 is allowed to have a large diameter to reduce the flow rate in the pipe 15, to have a small tilt angle or to have an increased length so that vapor-liquid separation may be carried out therein over a sufficient time.

While the form of the tilting pipe 15 differs depending on the feed amount of liquefied $CO_2$, the diameter of the tilting pipe 15 is larger than that of the draw pipe 4 and is usually 1.5 to 2 times as large as that of the draw pipe 4. For example, when the draw pipe 4 has an outside diameter of 27.2 mm, a pipe having an outside diameter of about 42.7 mm is employed as the tilting pipe 15, and the pipe 15 is allowed to have a tilt angle of 30° or less, preferably about 3 to 10° or less, with respect to the horizontal plane and a length of about 4000 to 5000 mm and to contain the liquefied $CO_2$ to a level (liquid depth) of about 300 to 400 mm. These dimensions and the like correlate one another, so that, for example, if the tilting pipe 15 is allowed to have a very large tilt angle, the flow rate of the liquefied $CO_2$ introduced thereto is increased to cause rippling on the liquid surface, making it difficult sometimes to effect vapor-liquid separation sufficiently due to inclusion of the vaporized $CO_2$ in the liquefied $CO_2$. On the other hand, if the tilting pipe 15 is allowed to have a very small tilt angle, the rate that vaporized $CO_2$ is separated from the liquefied $CO_2$ to flow up to the liquid surface is reduced to require much time to achieve sufficient vapor-liquid separation, and the length of the tilting pipe must be increased, leading to increase in the cost. In any case, it is preferred, in view of the flow rate of the liquefied $CO_2$ and the rate that the vaporized $CO_2$ floats up, to set the diameter and tilt angle of the tilting pipe 15 so that the flow rate of the liquefied $CO_2$ therein may not be higher than 0.3 m/sec, particularly may be about 30 to 100 mm/sec.

The tilting pipe 15 is preferably provided, as shown in FIG. 14, at the section where the vapor-liquid $CO_2$ mixture flows thereto, with an inflow pipe 17 which has the same diameter as that of the tilting pipe 15 and is interposed between the draw pipe 4 and the tilting pipe 15 and which is connected to the tilting pipe 15 in the tangential direction of the pipe 15, so that the liquefied $CO_2$ may smoothly flow into the tilting pipe 15 without bubbling. Further, the inflow pipe 17 is preferably connected at a position slightly higher than the middle part of the tilting pipe 15 so that the vapor-liquid $CO_2$ mixture may not flow directly into the liquid phase in the tilting pipe 15 and that the liquefied $CO_2$ may not flow out through the vaporized $CO_2$ exhaust pipe 16.

It should be noted here that when there is a sufficient horizontal distance from the liquefied $CO_2$ tank 3 to the snow horn 1, the tilting pipe 15 may partly or entirely be disposed linearly. The diameter of the tilting pipe 15 need not be the same over the entire length, and the pipe 15 may contain pipes having different diameters. The tilting pipe 15 need not be tilted at the same angle over the entire length, but it can be partly oriented horizontally or vertically.

By employing such tilting pipe 15 as described above, the liquefied $CO_2$ (vapor-liquid $CO_2$ mixture) introduced through the draw pipe 4 into the tilting pipe 15 is subjected to vapor-liquid separation therein as the mixture flows downward along the slope of the tilting pipe 15. Since the separated liquefied $CO_2$ flows relatively mildly to be mixed with the liquefied $CO_2$ stored in the tilting pipe 15, it causes no rippling on the liquid surface, avoiding inclusion of vaporized $CO_2$ in the liquefied $CO_2$. If vaporized $CO_2$ should be included in the liquefied $CO_2$, since a long distance can be secured between the liquid surface and the junction with the liquefied $CO_2$ supply pipe 6, vaporized $CO_2$ can be separated securely from the liquefied $CO_2$ on the way, preventing the vaporized $CO_2$ from being included in the liquefied $CO_2$ to be supplied to the injection nozzles 2.

Further, pilot lines 18a and 18b are connected to the upper end and the lower end of the tilting pipe 15 respectively, and a differential pressure type level gauge 19 is provided on the pilot line. The level gauge 19 detects the liquid level in the tilting pipe 15 based on the difference between the pressure to be applied to the liquid head of the liquefied $CO_2$ collected in the lower part of the tilting pipe 15 and the pressure of the gas phase present in the upper part of the tilting pipe 15. By carrying out opening and closing control of an automatic valve depending on the detected liquid level, the liquid level in the tilting pipe 15 can be maintained within a predetermined range, preventing securely vaporized $CO_2$ from migrating into the liquefied $CO_2$ to be supplied to the injection nozzles 2.

When $CO_2$ snow is to be made employing the apparatus described above, the vaporized $CO_2$ outlet valve 8 of the liquefied $CO_2$ tank 3 is first opened to supply vaporized $CO_2$ to the draw pipe 4, tilting pipe 15 and the liquefied $CO_2$ supply pipe 6, where it is pressurized and cooled therein before operation of making $CO_2$ snow is started in order to prevent formation of dry ice in the piping and blocking of the piping with the dry ice.

When the internal pressure of each pipe is increased to a predetermined level, the liquefied $CO_2$ outlet valve 9 is opened, and the vaporized $CO_2$ outlet valve 8 is closed to start supply of the liquefied $CO_2$ in the tank 3 and also to open the automatic valve 20 so as to exhaust the vaporized $CO_2$ from the tilting pipe 15. Thus, liquefied $CO_2$ (vapor-liquid $CO_2$ mixture) is introduced to the tilting pipe 15 while vaporized $CO_2$ is exhausted therefrom, and the liquefied $CO_2$ subjected to vapor-liquid separation is collected gradually at the lower part of the tilting pipe 15.

When the liquid level in the tilting pipe 15 is at a predetermined height, another automatic valve 22 provided on the feed pipe 6 is opened to supply the liquefied $CO_2$ containing no vaporized $CO_2$ to the injection nozzles 2 through the supply pipe 6 to be injected into the snow horn 1. The liquefied $CO_2$ injected into the snow horn 1 undergoes adiabatic expansion to form $CO_2$ snow, and the thus formed $CO_2$ snow falls through the lower end opening 1a of the snow horn 1.

Meanwhile, when the liquid level in the tilting pipe 15 detected by the differential pressure type level gauge 19 is at a predetermined height, the automatic valve 20 is closed to stop exhausting, whereas when the detected liquid level is lower than the predetermined level, the automatic valve 20 is opened to exhaust the vaporized $CO_2$ present in the upper part of the tilting pipe 15 and to store the liquefied $CO_2$ therein. By repeating these actions during the operation of making $CO_2$ snow, liquefied $CO_2$ can be supplied stably to the injection nozzles 2.

Since the vapor-liquid $CO_2$ mixture is subjected to vapor-liquid separation sufficiently in the tilting pipe 15 as described above, liquefied $CO_2$ containing no vaporized $CO_2$ can be supplied to the injection nozzles 2, $CO_2$ snow can constantly be made stably. Further, since the tilting pipe 15 is wound spirally around the snow horn 1, the installation space can be saved to achieve downsizing of the apparatus on a great margin compared with the case where a tank-shaped vapor-liquid separator is additionally employed.

TEST EXAMPLE 1

A $CO_2$ snow making test was carried out employing an apparatus having the constitution of the second embodiment. A snow horn having an entire length of 1000 mm and an outside diameter of 215.3 mm was employed. Four injection nozzles each having a 1 mm-diameter nozzle hole were positioned at the ceiling of the snow horn at 90° intervals on the same circle. The injecting directions of the nozzle holes were oriented in the radial direction of the ceiling. The test was carried out indoors at a normal temperature.

When a liquefied carbon dioxide gas having a pressure of 2.0 MPa and a temperature of −20° C. was supplied to the injection nozzles for injecting liquefied $CO_2$ in an amount of 3 kg/min in total, $CO_2$ snow assuming the form of very large snowflakes having a maximum size of more than 60 mm was obtained. The snowflakes of the $CO_2$ snow thus obtained stayed long in the air and fluttered as they fell to give an impression as if they were of natural snow falling, and thus artificial snow which can be enjoyed by viewers and suitably employed for producing snowy scene for movies and the like was obtained.

Although white fume flowed out through the opening of the snow horn together with the $CO_2$ snow, it was blown away completely by feeding air at a wind velocity of 5 to 8 m/sec by the blower. The maximum sizes of the snowflakes when the wind velocity is 5 m/sec, 6 m/sec, 7 m/sec and 8 m/sec were 60 mm, 52 mm, 48 mm and 43 mm, respectively, and snowflakes having desired size were made depending on the situation. The snow falling area was also changed depending on the wind velocity, and the area could be expanded by increasing the wind velocity.

TEST EXAMPLE 2

A test was carried out employing a snow horn having an entire length of 500 mm and an outside diameter of 139.8 mm and provided with four injection nozzles (as used in Example 1) each having a 1 mm-diameter nozzle hole which are positioned as shown in FIG. 8. In this test, the direction of injecting liquefied $CO_2$ was changed from 0 to 90° with respect to the diameter of the head of the snow horn. Like in the first embodiment, liquefied $CO_2$ having a pressure of 2.0 MPa and a temperature of −20° C. was supplied at a feed rate of 3 kg/min.

As a result, when the injecting angle of the nozzles was 0° C. (corresponding to the arrangement in FIG. 6), the maximum size of snowflakes obtained was about 15 mm, and the snowflakes were smaller than those obtained in Example 1 due to the difference in the size of snow horn. However, when the injecting direction of the nozzles was increased to 45°, snowflakes having a maximum size of 62 mm were obtained, and it was confirmed that snowflakes having a sufficient size can be obtained even if a small snow horn is employed. When snow-making test was carried out by changing the injecting angle at appropriate intervals from 1 to 90°, it was found that large snowflakes can be obtained within the range of 1 to 45° and that the size of snowflakes becomes smaller steeply beyond 45°, and the maximum size of the snowflakes obtained at an injecting angle of 90° was 10 mm.

COMPARATIVE EXAMPLE $CO_2$ snow was made employing an apparatus having the structure as described in Japanese Unexamined Patent Publication No. Hei 6-257937. The size of the snow horn, the conditions of feeding liquefied $CO_2$, etc. were substantially the same as in Test Example 1. The $CO_2$ snow obtained here was of small snowflakes, and no snowflake having a maximum size of more than 10 mm was obtained even when the conditions of feeding the liquefied $CO_2$ etc. were changed. Further, since the snowflakes have small surface area, they fell straight without fluttering as if natural snowflakes do. The $CO_2$ snow obtained sublimed readily indoors at normal temperature, and the substantial part of the $CO_2$ snow sublimed while it fell several meters after injection. In other words, it was confirmed that the $CO_2$ snow made by the conventional apparatus is not suitable as artificial snow to be enjoyed by viewers in events and the like.

EXAMPLE 3

A $CO_2$ snow making test was carried out employing an apparatus having the structure shown in FIG. 12. Sizes of the elements etc. in the apparatus are as follows.

The snow horn had an entire length of 500 mm and an outside diameter of 139.8 mm and provided with four injection nozzles positioned as shown in FIG. 6. Each injection nozzle had a 1.0 mm diameter nozzle hole, and liquefied $CO_2$ was supplied under a feed pressure of 2.0 MPa at a feed rate of 3 kg/min. The outside diameters of the draw pipe, the tilting pipe for achieving vapor-liquid separation and the liquefied $CO_2$ supply pipe were 27.2 mm, 42.7 mm and 13.8 mm, respectively. The portion of the tilting pipe wound spirally around the snow horn had a height of 585 mm and a tilt angle of 5° with respect to the horizontal plane.

As a result, the snow-making apparatus was operated continuously in a stable state and was able to make excellent $CO_2$ snow continuously.

Although only some embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for making carbon dioxide snow by injecting liquefied carbon dioxide into a snow horn from a ceiling of the snow horn having an opening at a lower end to effect adiabatic expansion to allow carbon dioxide snow to grow in the snow horn, the method comprising the steps of:

providing a snow horn having a concavely curved internal ceiling surface, injecting the liquefied carbon dioxide radially outward so that it flows along said internal concavely curved ceiling surface and continuously along an internal surface of the snow horn, and so that effusive flows of liquefied carbon dioxide flow independently at an inner upper part of the snow horn to be combined partly with one another at an inner lower part of the snow horn.

2. A method for making carbon dioxide snow by injecting liquefied carbon dioxide into a snow horn from a ceiling of the snow horn having an opening at a lower end to effect adiabatic expansion to allow carbon dioxide snow to grow in the snow horn, comprising the steps of:

injecting the liquefied carbon dioxide radially outward so that it may flow along an internal curved surface of the ceiling and continuously along an internal surface of the snow horn and that effusive flows of liquefied carbon dioxide may flow independently at an inner upper part of the snow horn and may be combined partly with one another at an inner lower part of the snow horn, blowing gas against the carbon dioxide snow falling through the opening of the snow horn, and controlling the wind velocity of the gas so as to adjust the size of snowflakes of the carbon dioxide snow.

3. A method for making carbon dioxide snow by injecting liquefied carbon dioxide into a snow horn from a ceiling of the snow horn having an opening at a lower end to effect adiabatic expansion to allow carbon dioxide snow to grow in the snow horn, comprising the steps of:

injecting the liquefied carbon dioxide radially outward so that it may flow along an internal curved surface of the ceiling and continuously along an internal surface of the snow horn and that effusive flows of liquefied carbon dioxide may flow independently at an inner upper part of the snow horn and may be combined partly with one another at an inner lower part of the snow horn, introducing liquefied carbon dioxide from a liquefied carbon dioxide source into a tilting pipe to effect vapor-liquid separation therein, and extracting vaporized carbon dioxide from an upper part of the tilting pipe, while the liquefied carbon dioxide drawn from a lower part of the tilting pipe is injected into the snow horn.

4. An apparatus for making carbon dioxide snow comprising a snow horn having an opening at a lower end and an upper end having a concavely curved inner surface forming a ceiling:

a nozzle positioned at said ceiling of the snow horn and being operative to inject liquefied carbon dioxide into the snow horn; the injection nozzle being positioned with respect to the inner surface of the snow horn to inject the liquefied carbon dioxide radially outward so that it flows along the concavely curved internal surface of the ceiling and continuously along an internal surface of the snow horn and that effusive flows of liquefied carbon dioxide flow independently at an inner upper part of the snow horn to be combined partly with one another at an inner lower part of the snow horn.

5. An apparatus for making carbon dioxide snow comprising a snow horn having an opening at a lower end and a nozzle positioned at a ceiling of the snow horn to inject liquefied carbon dioxide into the snow horn;

the injection nozzle being positioned to be able to inject the liquefied carbon dioxide radially outward so that it may flow along the curved internal surface of the ceiling and continuously along the internal surface of the snow horn and that effusive flows of liquefied carbon dioxide may flow independently at an inner upper part of the snow horn and may be combined partly with one another at an inner lower part of the snow horn; and wherein blowing means, whose wind velocity is adjustable, is disposed adjacent to the opening of the snow horn.

6. The apparatus for making carbon dioxide snow according to claim 5, wherein the blowing means contains a blower which utilizes as a drive source thereof vaporized carbon dioxide separated from liquefied carbon dioxide in a vapor-liquid separator provided on a line of supplying the liquefied carbon dioxide to the injection nozzle.

7. The apparatus for making carbon dioxide snow according to claim 4, wherein the apparatus is provided with a plurality of injection nozzles positioned on the concavely curved internal surface of the ceiling, and the direction of injecting the liquefied carbon dioxide is set at an angle of from 0 to 90° with respect to the radial direction of the ceiling.

8. An apparatus for making carbon dioxide snow comprising a snow horn having an opening at a lower end and a nozzle positioned at a ceiling of the snow horn to inject liquefied carbon dioxide into the snow horn;

the injection nozzle being positioned to be able to inject the liquefied carbon dioxide radially outward so that it may flow along the curved internal surface of the ceiling and continuously along the internal surface of the snow horn and that effusive flows of liquefied carbon dioxide may flow independently at an inner upper part of the snow horn and may be combined partly with one another at an inner lower part of the snow horn; and wherein a tilting pipe is connected to a draw pipe for drawing liquefied carbon dioxide from a liquefied carbon dioxide tank;

the tilting pipe having at an upper part thereof an outlet for extracting vaporized carbon dioxide separated after vapor-liquid separation in the tilting pipe and at a lower part thereof a liquefied carbon dioxide supply pipe for supplying liquefied carbon dioxide subjected to vapor-liquid separation to the injection nozzle.

9. The apparatus for making carbon dioxide snow according to claim 8, wherein the draw pipe is connected to a middle part of the tilting pipe.

10. The apparatus for making carbon dioxide snow according to claim 8, wherein the tilting pipe is wound spirally around the snow horn.

* * * * *